United States Patent
Tse et al.

(10) Patent No.: US 6,345,052 B1
(45) Date of Patent: Feb. 5, 2002

(54) METHOD AND APPARATUS FOR THE RELIABLE TRANSITION OF STATUS SIGNALS FROM AN INTERFACE DEVICE WHEN USING A LOCALIZED SAMPLING ARCHITECTURE

(75) Inventors: Richard Tsz-Shiu Tse, Vancouver; Shawn Patrick McDowell, Burnaby, both of (CA)

(73) Assignee: PMC-Sierra, Ltd. (CA)

(*) Notice: Subject to any disclaimer, the term of this patent is extended or adjusted under 35 U.S.C. 154(b) by 0 days.

(21) Appl. No.: 09/186,159

(22) Filed: Nov. 5, 1998

(51) Int. Cl.[7] .............................................. H04L 12/56
(52) U.S. Cl. .................................... 370/395.6; 370/465
(58) Field of Search ................................. 370/230, 232, 370/235, 395, 423, 424, 463, 395.6, 465

(56) References Cited

U.S. PATENT DOCUMENTS 5,784,370 A * 7/1998 Rich .......................... 370/395
5,889,778 A * 3/1999 Huscraft et al. ............ 370/395
6,115,360 A * 9/2000 Quay et al. ................. 370/235

OTHER PUBLICATIONS

The ATM Forum Technical Committee, "Utopia Specification Level 1, Version 2.01", Mar. 21, 1994.
The ATM Forum Technical Committee, "Utopia Level 2, Version 1.0", Jun. 1995.

* cited by examiner

Primary Examiner—Hassan Kizou
Assistant Examiner—Tim Spafford
(74) Attorney, Agent, or Firm—Hall, Priddy, Myers & Vande Sande

(57) ABSTRACT

Method and apparatus are provided for guaranteeing that transmit cell available signals transmitted from an ATM-PHY interface device conform to a communication protocol. A previous transmit cell available signal from the previous clock cycle is stored and a transmit status signal and a transmit enable signal for the current clock cycle are sampled. One of the transmit status signal and the previous transmit cell available signal are selected as the new transmit cell available signal based upon the state of the transmit enable signal and the transmit status signal.

24 Claims, 16 Drawing Sheets

METHOD AND APPARATUS FOR THE RELIABLE TRANSITION OF STATUS SIGNALS FROM AN INTERFACE DEVICE WHEN USING A LOCALIZED SAMPLING ARCHITECTURE

FIELD

The present invention relates generally to digital broadband transmission systems, and more particularly, to a state machine architecture for the reliable transition of status signals when using a localized sampling architecture in an ATM-PHY interface device.

BACKGROUND

The Asynchronous Transfer Mode (ATM) protocol has been widely adopted to provide high-speed, low-delay multiplexing and switching networks to support any type of user traffic, including voice, data and video. ATM resides on top of the physical layer (PHY) of a conventional layered model, but does not require the use of a specific physical layer protocol. The PHY layer may be implemented using any of a number of interfaces and protocols, including SONET/SDH, DS3, FDDI and others.

At the ATM-PHY interface, the Universal Test & Operations PHY Interface for ATM protocol (commonly known as UTOPIA) has been accepted by the ATM Forum group as the protocol of choice to interconnect the ATM layer to the PHY layer. The ATM Forum's specifications for UTOPIA are found in AF-PHY-0017.000, "UTOPIA Specification", Level 1, Version 2.01, Mar. 21, 1994. and in AF-PHY-0039.000, "UTOPIA, An ATM-PHY Interface Specification", Level 2, Version 1.0, Jun. 1, 1995.

With the continuing expansion of digital broadband transmission systems, including ATM systems, there is growing demand for higher bus speeds between interoperable equipment. Maintaining satisfactory timing requirements at higher bus speeds can be difficult to meet and poses a challenge at the ATM-PHY interface. The ATM Forum's specification for UTOPIA defines timing requirements for ATM-PHY interfaces which must be satisfied to ensure interoperability when using UTOPIA. Timing requirements set by the UTOPIA specification can be difficult to meet, particularly at higher bus speeds. For instance, the 50 MHz UTOPIA bus allows for a maximum of 4 nanoseconds (ns) for input set-up times and 1 ns for input hold times.

Timing constraints such as those imposed by the UTOPIA specification can be particularly difficult to satisfy in multi-channel VLSI devices having an ATM cell processor for each channel. ATM cell processors are typically self-contained macro-cells designed to connect to the UTOPIA bus without separate resampling devices. ATM cell processors designed in this way have the advantage of being adaptive for use in single channel UTOPIA Level 1 compliant devices as well as with the UTOPIA level 2 bus. However, in such a self-contained architecture all circuits that sample the UTOPIA bus input signals reside within the ATM cell processor macro-cells. Locating sampling circuitry within each macro-cell of a multi-channel device has the disadvantage of making set-up and hold times difficult to satisfy as physical routing of the bus signals in the VLSI device is different for each of the ATM cell processors, resulting in variability in this top-level routing. Furthermore, the routing of the bus signals within each ATM cell processor macro-cell, also referred to as macro-cell routing, may not be very deterministic. The variability in routing delay arising from these circumstances makes it difficult to predict which signals will have the worst timing characteristics prior to the physical layout of the device, thereby increasing the number of layout iterations required to satisfy the timing constraints for the UTOPIA specification. In addition, typically delay elements are required in each path that the UTOPIA bus input signal takes before it is sampled. While delay elements may be measured and adjusted after each layout iteration to improve the performance of the circuit, the variability arising from the combination of top-level routing and macro-cell routing remains a problem which is difficult to remedy in such circumstances, even for a lower speed bus. The problem of variability in routing delay becomes even more pronounced with the tighter timing requirements of a higher speed bus such as the UTOPIA 50 MHz bus.

Apart from the need for a simplified architecture for satisfying the timing requirements at the ATM-PHY interface, it will be appreciated by persons skilled in the art that the UTOPIA interface requires zero wait-state reaction to its input control signals. Routing delays at both the top-level and within each macro-cell can contribute to timing problems when interfacing the ATM layer with PHY layers. As a result, an ATM cell processor macro-cell must predict the next state of the input signals from the UTOPIA bus in order that the ATM cell processor can configure its outputs accordingly so as to avoid the possibility of incorrect predictions resulting in lost cells or FIFO overruns. If input control signals from the UTOPIA bus do not behave as predicted, a timing mechanism must be provided to ensure that the output status signals from the ATM cell processor continue to perform correctly in such circumstances. It would be advantageous if such a timing mechanism would extend to both single-channel and multi-channel implementations. It would be also advantageous if such a timing mechanism would enable the ATM-PHY interface device to maintain set-up and hold timing constraints that are much tighter than those required by the UTOPIA standard for the ATM-PHY interface. This would allow systems interfacing with the ATM-PHY interface device the flexibility of having more relaxed timing, thereby reducing design cycle time and the cost at both the device and system level.

SUMMARY OF THE INVENTION

It is an object of the present invention to fulfill the aforementioned needs in the art for an improved architecture at the ATM-PHY interface. In the present invention there is provided an architecture which can be used to simplify the endeavor to satisfy the timing requirements at the ATM-PHY interface. The architecture is based on localizing and reducing the number of logic units which sample the input signals arriving at the ATM-PHY interface device from the UTOPIA bus.

In another aspect of the invention, there is provided a method and apparatus for handling incorrect predictions by the ATM-PHY interface device of incoming signals arriving at the ATM-PHY interface from the UTOPIA bus when using the localized sampling architecture. In one embodiment, a state machine is provided which serves as a conditioning circuit to ensure that incorrect predictions by the ATM-PHY interface device of the incoming UTOPIA compliant signals do not cause the ATM-PHY interface device to output transmit cell available signals out of synch with the UTOPIA protocol.

The invention may be applied to serve both single-channel and multi-channel ATM-PHY devices and can be used in both single-PHY and multi-PHY architectures adding further versatility to its application.

Advantageously, the architecture of the present invention allows for a simple deterministic layout procedure to be used which does not require extensive layout iterations to satisfy tight timing constraints such as those defined by the UTOPIA specification.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

Figure 1:
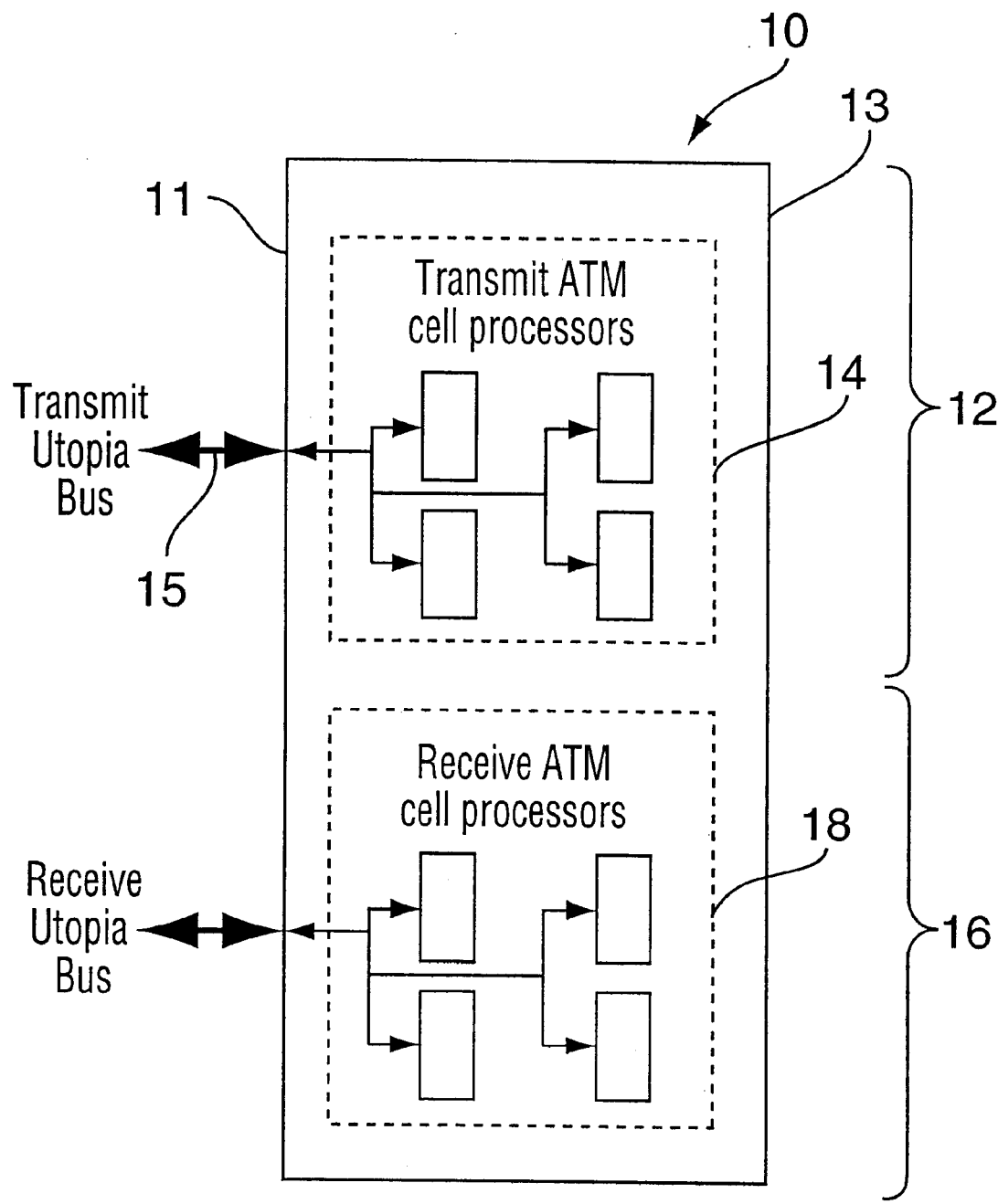
FIG. 1 is a block diagram of a conventional ATM-PHY interface device.

It will be appreciated that for simplicity and clarity of illustration, elements illustrated in the accompanying drawings have not necessarily been drawn to scale. For example, the dimensions of some of the elements are exaggerated relative to other elements for clarity. Furthermore, where considered appropriate, reference numerals and label descriptors have been repeated among the drawings to indicate corresponding or analogous elements.

DETAILED DESCRIPTION

Referring to FIG. 1, there is shown a known system for interfacing an ATM-PHY interface device 10 with other ATM layer devices (not shown) on the system-side 11 and with physical layer (PHY) links on the line-side 13. In the illustrative embodiment, ATM-PHY interface device 10 is a quad-channel device that interfaces, on the system side, with other ATM layer devices through an 8 or 16 bit wide UTOPIA bus and on the line-side, with up to four PHY layer devices. ATM-PHY interface device 10 includes a transmit-side 12 having four transmit cell processors 14, and a receive-side 16 having four receive cell processors 18. On transmit-side 12, each of transmit cell processors 14 is a macro-cell having its own transmit first-in first-out (FIFO) buffer (not shown) which provides FIFO management and a transmit cell interface to the line side transmission system of the subject transmit cell processor. Each transmit FIFO buffer can contain up to four ATM cells. The transmit FIFO buffers provide the cell rate decoupling function between the system-side ATM layer and the line-side transmission system connecting the PHY layers. Management functions of each transmit FIFO buffer include passing cells from the subject transmit FIFO buffer to its transmit cell processor for transmission to the corresponding PHY layer on line-side 13, indicating to the appropriate transmit cell processor when the subject transmit FIFO buffer is full, maintaining the read and write pointers of the subject transmit FIFO buffer and detecting a FIFO overrun condition. For each transmit cell processor, idle cells are automatically inserted into the line-side transmission stream when the corresponding transmit FIFO buffer contains less than one full cell. Each transmit cell processor 14 also optionally integrates circuitry to support ATM cell payload scrambling for cells read from the corresponding transmit FIFO buffer, header check sequence (HCS) generation, and cell header scrambling.

In FIG. 1, the transmit cell processors 14 each contain sampling circuitry to sample the input signals from the UTOPIA bus 15. The redundant sampling circuitry makes meeting set-up and hold time constraints for the bus interface difficult to satisfy since physical routing in ATM-PHY device 10 of input signals from bus 15 is different for each of the transmit cell processors 14. Timing constraints are particularly problematic for a high speed bus, such as, for example, with the 50 MHz UTOPIA bus protocol which allows a maximum of 4 ns for input set-up and 1 ns for input hold. In addition to the top-level routing delay introduced by the redundant sampling circuitry in each transmit cell processor, the routing of signals within each transmit cell processor macro-cell may not be very deterministic thereby further adding to the difficulty in predicting the timing characteristics of signals, routed through device 10.

Figure 2:
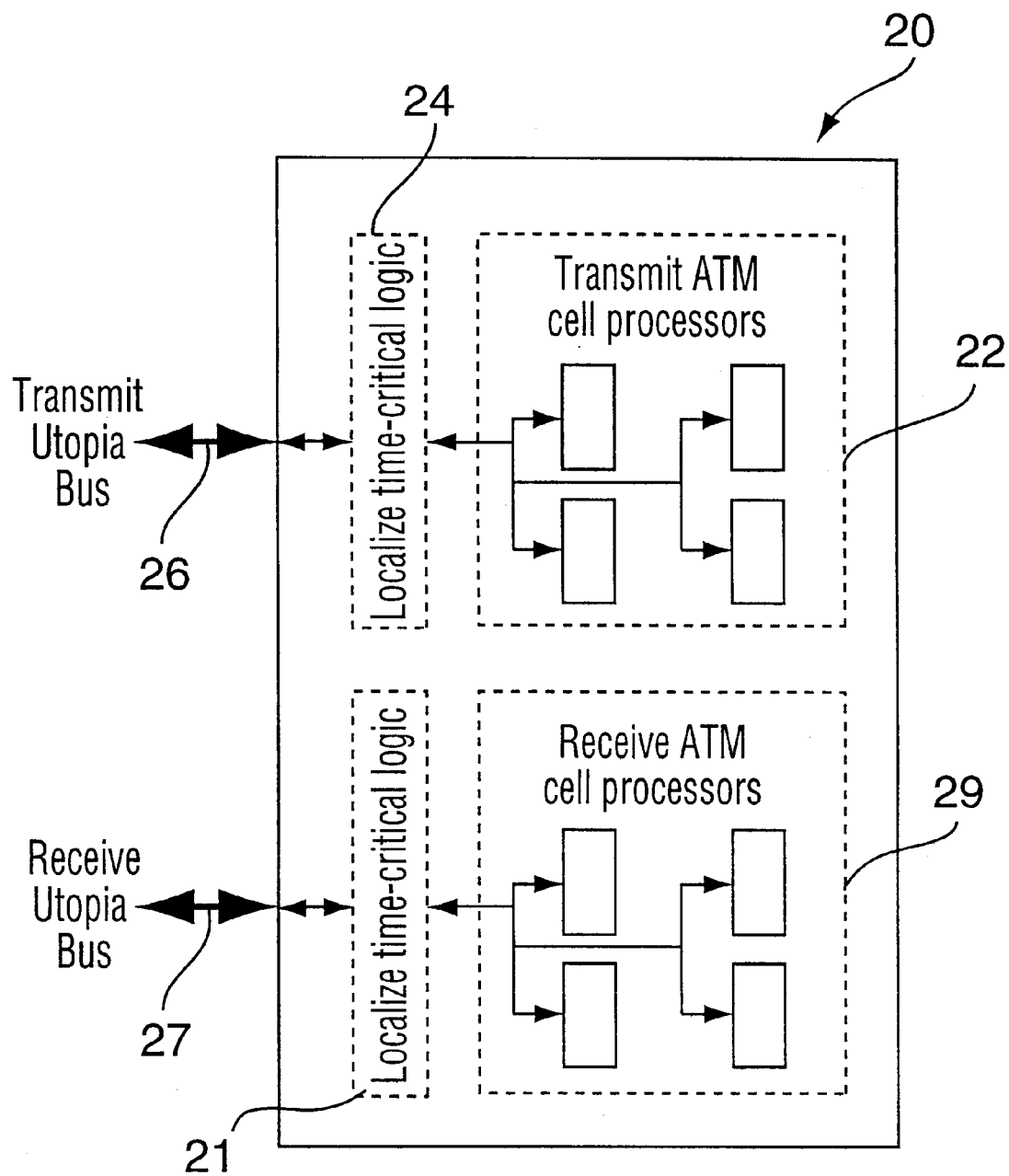
FIG. 2 is a block diagram of an ATM-PHY interface device having a localized sampling circuit architecture in accordance with the present invention.

Referring to FIG. 2, there is shown an illustrative embodiment of an ATM-PHY interface device 20 having an improved architecture for simplifying the handling of UTOPIA interface requirements in accordance with the present invention. In ATM-PHY device 20 the sampling circuitry in each of transmit cell processors 22 has been removed and replaced with localized sampling circuitry 24 located at the top level of ATM-PHY device 20 between transmit cell processors (TXCPs) 22 and UTOPIA bus 26. In the illustrative embodiment, input signals from UTOPIA bus 26 are sampled by localized sampling circuitry 24 before being passed on to the appropriate ATM transmit cell processor macro-cells 22. The local sampling of UTOPIA input signals with sampling circuit 24 in ATM-PHY interface device 20 reduces the fan-out of signals which need to be sampled. Furthermore, since the sampling logic does not consist of as many logic gates as in the redundant sampling model in FIG. 1, the sampling logic can be preferably isolated into a small area of ATM-PHY interface device 20 and optimally placed thereby reducing the delay and the variability in the delay due to the physical layout of ATM-PHY interface device 20.

As illustrated in FIG. 2, the sampling circuitry within the receive cell processors can also be localized between UTOPIA bus 27 and receive cell processors 29. Sampling circuitry 21 brings the advantages of localized sampling to the receive side of ATM-PHY interface device 20.

Figure 3:
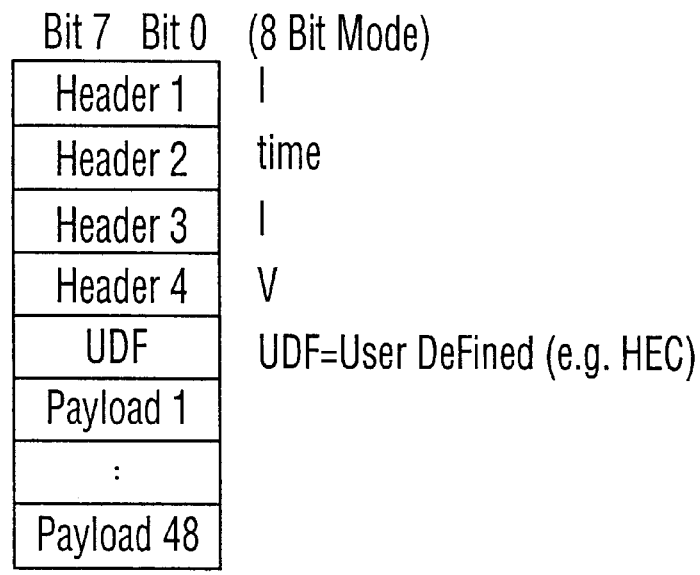
FIG. 3 is a diagram of a standard ATM cell structure in 8 bit mode.
Figure 4:
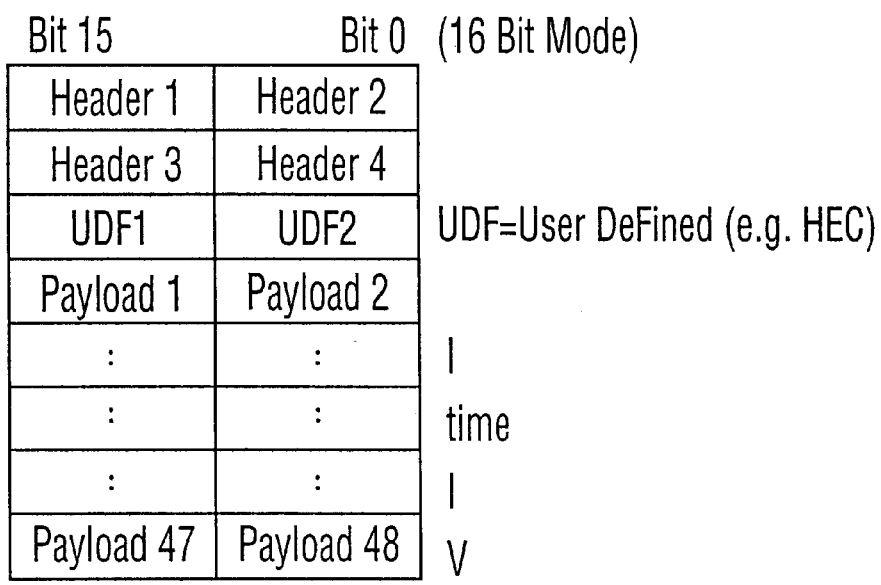
FIG. 4 is a diagram of a standard ATM cell structure in 16 bit mode.

Referring to FIG. 3, there is shown an ATM cell structure 53 octets or bytes in length comprising a 5 octet cell header (H1 to H5) and a 48 octet cell payload (P1 to P48). As shown in FIG. 3, in an 8-bit wide bus mode, an ATM cell is arranged into 53 8-bit words. Referring to FIG. 4, in a 16-bit wide bus mode, an ATM cell is 54 octets arranged into 27 words of 16 bits each. In the 27 word arrangement, an ATM cell can include an extra header octet for storing header check sequence information. Alternatively, user defined fields (UDF) may be omitted since they can be generated or terminated inside a physical (PHY) layer device.

Figure 5:
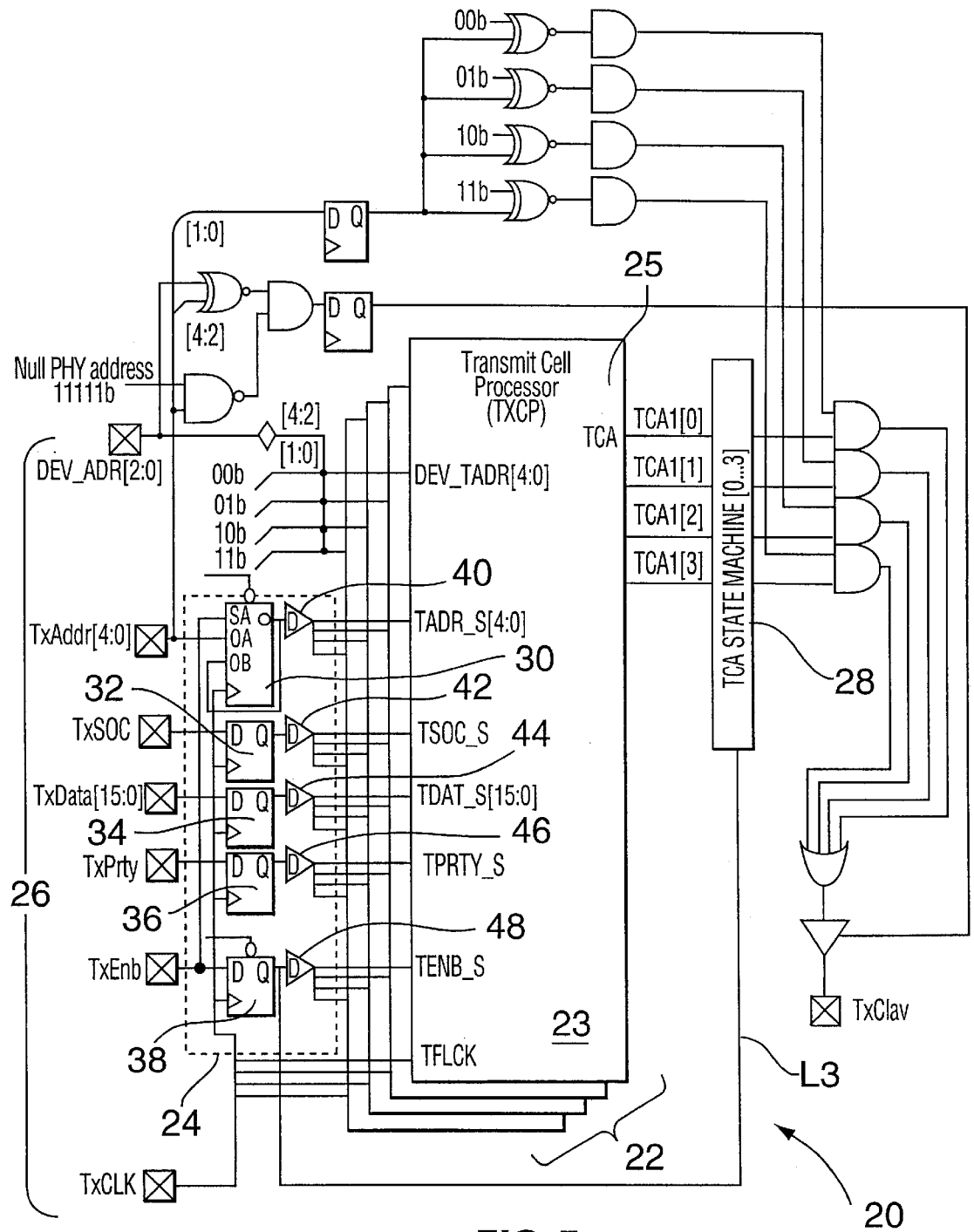
FIG. 5 is a schematic diagram of the transmit side of a quad-channel ATM-PHY interface device in accordance with the present invention.

Referring to FIG. 5, there is shown a preferred arrangement of transmit cell processors 22 coupled to localized sampling circuitry 24 and M state machines 28 in accordance with the present invention. Sampling circuit 24 includes flip flops 32, 36, and 38 and flip flop banks 30 and 34 which interconnect the transmit cell processors 22 to a UTOPIA Level 2 bus interface 26. In the embodiment illustrated, flip flop bank 30 is a bank of 5 flip flops to accommodate the TxAddr[4:0], and flip flop bank 34 is a bank of 16 flip flops to accommodate TxData[15:0]. Delay elements 42, 46, 48, 40 and 44 interpose (i) transmit cell processors 22 and (ii) flip flops 32 36, and 38 and flip flop banks 30 and 34. These delay elements are provided to account for possible clock skew between local sampling circuit 24 and transmit cell processors 22 so that set-up and hold time requirements are satisfied. ATM cells carried on the UTOPIA bus arrive at interface 26 on the Transmit Cell Data Bus (TxData[15:0]). In the illustrative embodiment, TxData[15:0] is a 16 bit wide bus which is sampled by flip flop bank 34 of circuit 24 on the rising edge of a transmit clock input (TxCLK) and is preferably considered valid by the appropriate one of transmit cell processors 22 when the transmit multi-PHY enable input (TxEnb) is simultaneously asserted and the ATM-PHY interface device 20 is selected on the UTOPIA interface. In the illustrated embodiment, ATM-PHY interface device 20 is selected using the Device Identification Address bus (Dev_Addr[2:0]) and the Transmit Address bus (TxAddr[4:0]). Dev_Addr[2:0] is used to address device 20 on the UTOPIA interface. When TxAddr[4:2] (the most significant bits of TxAddr[4:0]) match the Dev_Addr[2:0] inputs, ATM-PHY interface device 20 has been selected. TxAddr[1:0] is used to select the desired channel and cell processor within the quad-channel device.

In FIG. 5, the TxEnb signal is an active low input which is sampled by flip flop 38 and used along with the TxAddr[4:0] inputs to initiate writes to the appropriate transmit FIFO buffers within transmit cell processors 22. In the illustrative embodiment, when TxEnb is sampled low by sampling circuit 24 using the rising edge of TxCLK, data carried on the TxData[15:0] bus is written into the transmit FIFO buffer of the transmit cell processor selected by the TxAddr[4:0] address bus.

The start of a cell on the TxData[15:0] bus is marked on the UTOPIA bus by the transmit start of cell signal (TxSOC). When TxSOC is high, the first word of an ATM cell structure is present on the TxData bus. TxSOC is sampled by flip flop 32 of sampling circuit 24 on the rising edge of TxCLK and is preferably considered valid by the appropriate one of transmit cell processors 22 when TxEnb is simultaneously asserted and the ATM-PHY device 20 is selected on the UTOPIA interface. The parity of the TxData [15:0] bus is indicated with the TxPrty signal which is sampled by flip flop 36.

Sampled signals from sampling circuit 24 are received by the transmit cell processors 22 at their receive-side interfaces 25 with circuit 24. The receive-side interface of transmit cell processor 23 comprises TADR_S[4:0], TDAT_S[15:0], TENB_S, TSOC_S and TPRTY_S which receive sampled signals from TxAddr[4:0], TxData[15:0], TxEnb, TxSOC and TxPrty respectively. Receive-side interface 25 includes a Transmit FIFO Write Clock input (TFCLK) which is synchronized to TxCLK. The TFCLK signal is used to synchronize the writing of ATM cells to the transmit FIFO buffer of a transmit cell processor. Receive-side interface 25 can also include a device address bus DEV_TADR[4:0] which is coupled to DEV_ADR[2:0]. Each of the remaining transmit cell processors 22 have receive-side interfaces similar to that of transmit cell processor 23.

In FIG. 5, each of the M state machines 28 provides a mechanism to guarantee that incorrect predictions of activity on UTOPIA bus 26 by one of the transmit cell processors 22 do not cause a TxClav signal which is output by ATM-PHY device 20 to transition at the wrong time. Each of the M state machines 28 correspond to one of the transmit cell processors 22. Thus, in FIG. 5 M is four and each of the four state machines 28 has an input coupled to one of the TCA outputs from the transmit cell processors 22. Each of the state machines 28 also includes inputs coupled to the TxEnb signal and TxCLK.

In the UTOPIA standard two methods of flow control are provided: octet-level and cell-level. Preferably, transmit cell processors 22 support cell level transfers by default in which case TxEnb will be asserted until an entire cell is transferred. For octet-level flow control, cell transfer can be interrupted after any byte (for the 8-bit interface) or any word (for the 16-bit interface) of the ATM cell. Cell transfer for octet-level flow control can be interrupted by deasserting TxEnb.

As depicted in FIG. 5, each of the transmit cell processors 22 has a Transmit Cell Available (TCA) line out for transmitting status signals (illustrated as TCA1[0]) to TCA1[3]). For a given transmit cell processor, a TCA signal is used to indicate when a cell is available in the corresponding transmit FIFO buffer for the line-side port selected by TADR[4:0]. When high, a TCA indicates that the corresponding transmit FIFO buffer is not full and a complete cell may be written. When TCA goes low, it can be configured to indicate either that the corresponding transmit FIFO buffer is near full or that the corresponding transmit FIFO buffer is full. TCA signals preferably correspond to UTOPIA-type transmit cell available (TxClav) signals so as to provide a UTOPIA-compatible interface. To this end, for an 8-bit data bus mode of the illustrative embodiment, a preferable transition point for a TxClav signal is when payload byte P43 of an ATM cell is sampled on the transmit cell data bus (an 8-bit version of TxData[15:0]). This transition point for TxClav is used to indicate that there is no longer any space available to store ATM cells before transmission. For a 16-bit data bus mode, such as TxData[15:0], a preferable TxClav transition point for octet-level flow control is when payload word P19 of an ATM cell is sampled at TxData[15:0]. Thus, when serving as a UTOPIA-compatible interface, ATM-PHY device 20 preferably outputs a synthesized TxClav signal which enables compatibility with UTOPIA.

Figure 5A:
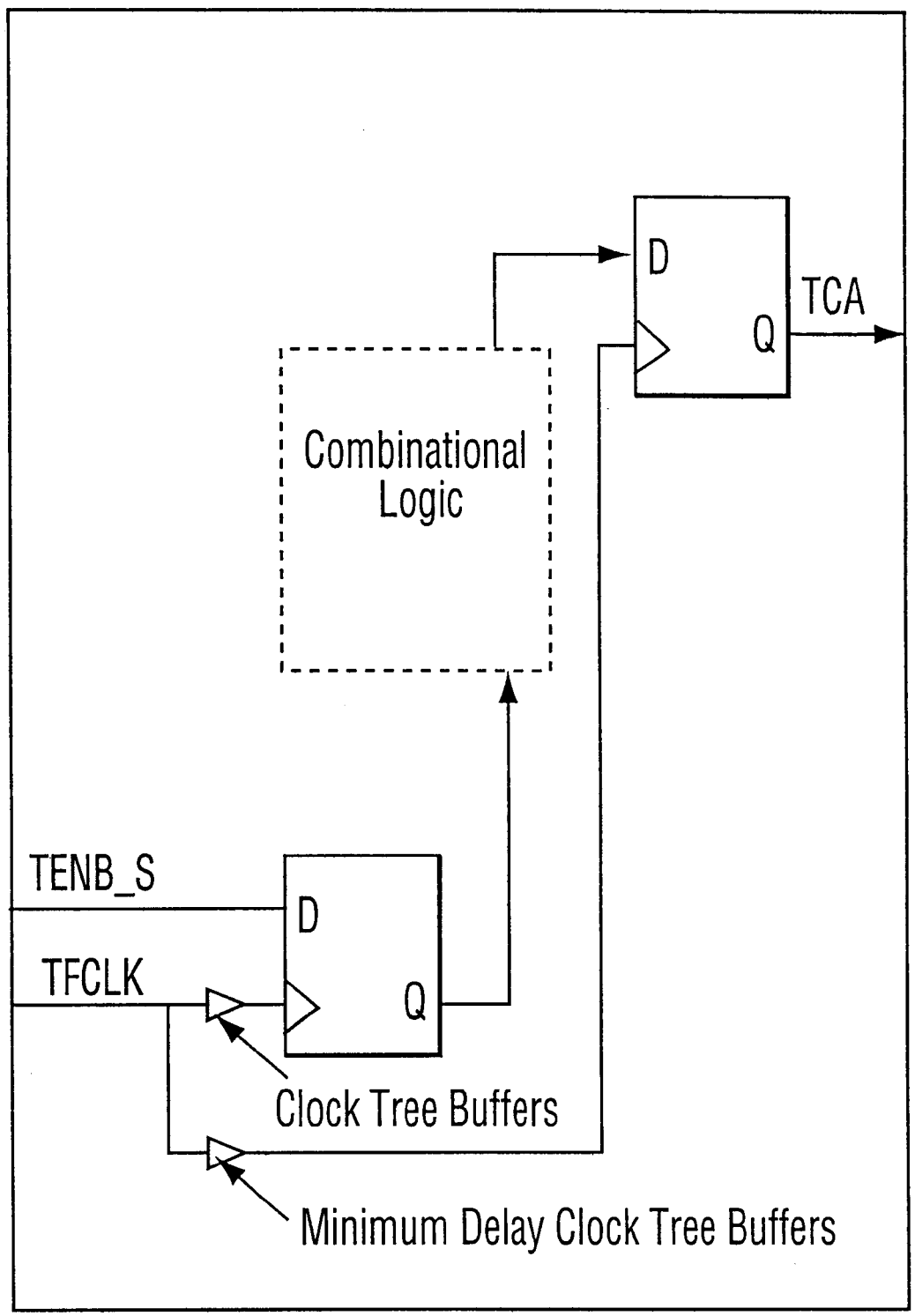
FIG. 5A is a schematic diagram of a transmit cell processor wherein sampled transmit enable signals arriving on an input for the cell processor are re-sampled.

It will be appreciated by persons skilled in the art that the UTOPIA interface standard requires a zero wait-state reaction to its input control signals. Thus, each of the ATM transmit cell processors 22 must predict the next state of the input signals arriving on UTOPIA bus 26 so that the cell processors 22 can configure their output status signals accordingly. In the illustrative embodiment in FIG. 5, when the localized sampling circuit 24 is implemented in ATM-PHY device 20, the transmit cell processors 22 receive the input signals from the UTOPIA bus interface 26 one clock cycle after they are first sampled by sampling circuit 24. Furthermore, signals received by the receive-side interfaces 25 can in turn be sampled by their corresponding transmit cell processors 22 as illustrated by way of example in FIG. 5A. Thus, in such an arrangement there is a two-clock cycle window for error wherein the input signals from the UTOPIA bus 26 may not behave as predicted by the transmit cell processors 22.

False predictions by the transmit cell processors 22 during octet-level flow control can result in TCA signals failing to transition at the appropriate transition points specified by UTOPIA. In the examples which follow, an 8-bit wide data bus mode (TxData[7:0]) is used. However, it will be appreciated that other data transfer modes are applicable and contemplated within the scope of the present invention.

Figure 6:
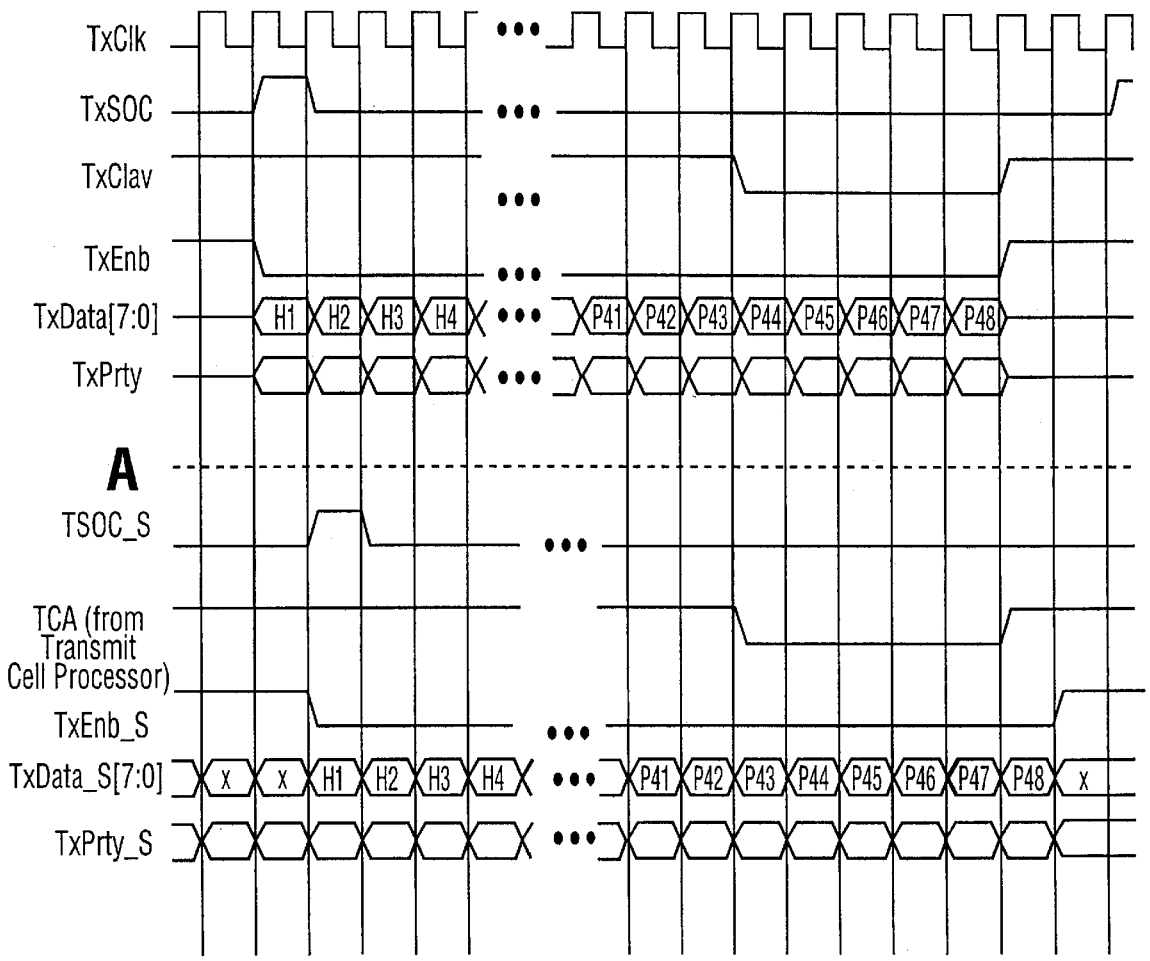
FIG. 6 is a timing diagram illustrating two sets of waveforms: a first set showing a typical ATM cell transfer according to the UTOPIA protocol and a second set showing the cell transfer as seen by a transmit cell processor.

Referring to FIG. 6, there is shown a timing diagram for two sets of waveforms for an uninterrupted octet-level cell transfer. The top half of FIG. 6 above line A shows a typical ATM cell transfer on the UTOPIA bus, including the timing of TxClav. The bottom half of FIG. 6 below line A shows the transfer as seen by one of transmit cell processors 22. As shown in FIG. 6, in the 8-bit data bus mode TxClav transitions from active to inactive on the rising edge of the TxClk signal (also referred to in this specification as the aforementioned TxCLK) which samples the ATM cell payload byte P43 on the TxData[7:0] bus. In the example shown in FIG. 6, the TCA signal from one of the transmit cell processors 22 transitions in synch with the UTOPIA-compatible requirement for TxClav.

Due to the delay introduced by the localized sampling circuit 24, interruptions in the transfer of a cell for octet-level flow control can result in incorrect predictions by the transmit cell processors 22 in a number of different circumstances. For instance, in the 8 bit data mode, an incorrect prediction will occur if cell transfer is paused on P42 or P43. This is because the corresponding one of transmit cell processors 22 does not realize that a transfer was interrupted until the next clock cycle. This problem is illustrated in the examples in FIGS. 7 to 9.

Figure 7:
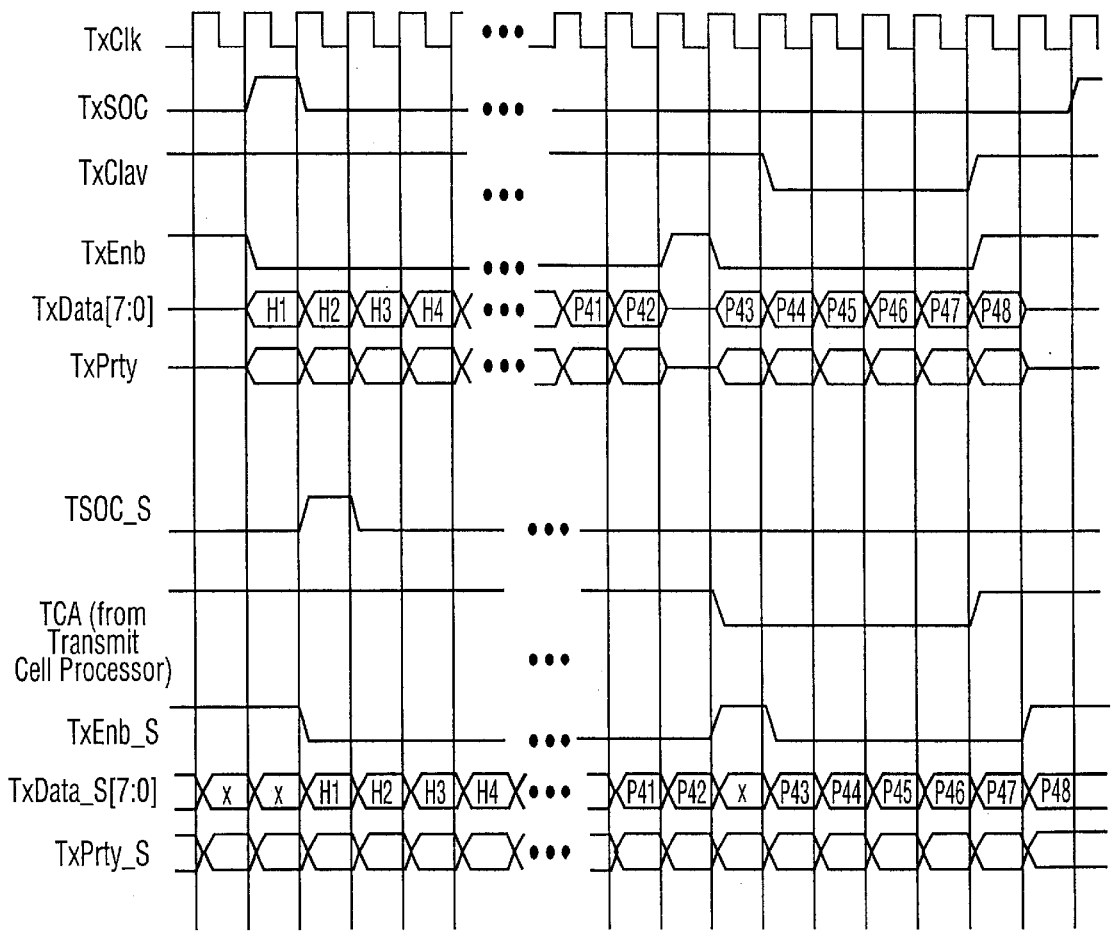
FIG. 7 is a timing diagram illustrating an incorrect prediction of cell transfer activity by a transmit cell processor when byte-level transfer is used and the transfer is interrupted on P43.

Referring to FIGS. 5 and 7, when P42 arrives at TDAT_S[15:0] in the 8-bit bus mode, transmit cell processor 23 will predict that the next byte to arrive on TDAT_S[15:0] will be P43 and will deassert its TCA signal at the beginning of the next cycle in conformance with this UTOPIA-compatible transition point. In this case, cell processor 23 makes its predictions one cycle in advance because of the one cycle delay introduced by sampling circuit 24. However, if a one cycle pause on P43 occurs at TxData[15:0], transmit cell processor 23 will not know that the localized sampling circuit 24 did not sample P43. This is because TxEnb_S is one clock cycle behind TxEnb. As a result, processor 23 does not know that cell transfer was paused in time to delay deassertion of its TCA signal. Instead, processor 23 will predict that the next byte will be P43, which will result in the corresponding TCA signal being deasserted one clock cycle earlier than the expected transition point for a UTOPIA-compatible TxClav signal as illustrated in FIG. 7.

Figure 8:
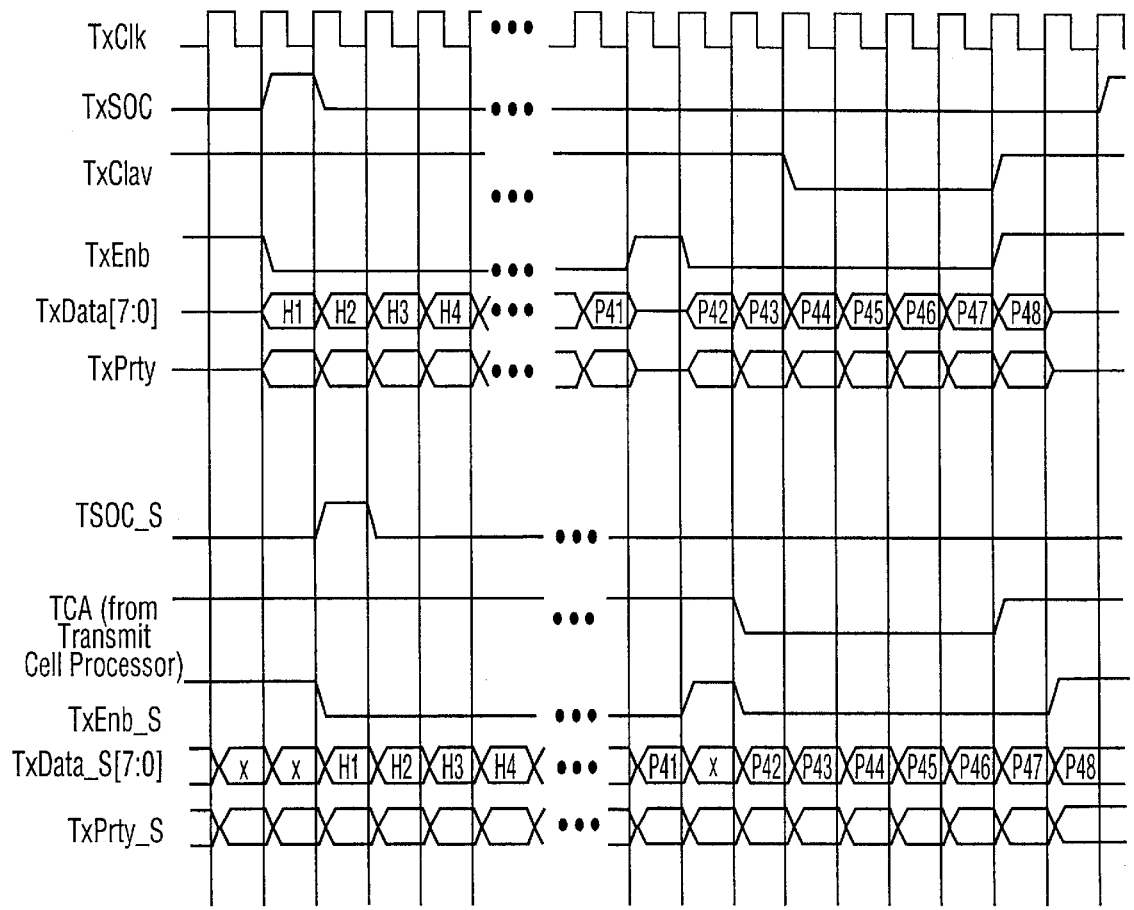
FIG. 8 is a timing diagram illustrating an incorrect prediction of cell transfer activity by a transmit cell processor when byte-level transfer is used and the transfer is interrupted on P42.

Referring to FIGS. 5 and 8, similarly, if a one clock cycle pause on P42 occurs at TxData[15:0] on bus interface 26, processor 23 will predict, when receiving P41, that in the next cycle P42 will arrive on TDAT_S[15:0], again resulting in the TCA signal deasserting one clock cycle too early. As illustrated in the waveforms in FIG. 8, TxEnb_S is again one clock cycle behind TxEnb and the transmit cell processor does not know that the cell transfer was paused in time to delay the deassertion of its TCA output signal, thereby resulting in the TCA signal output by the transmit cell processor 23 deasserting too early.

Figure 9:
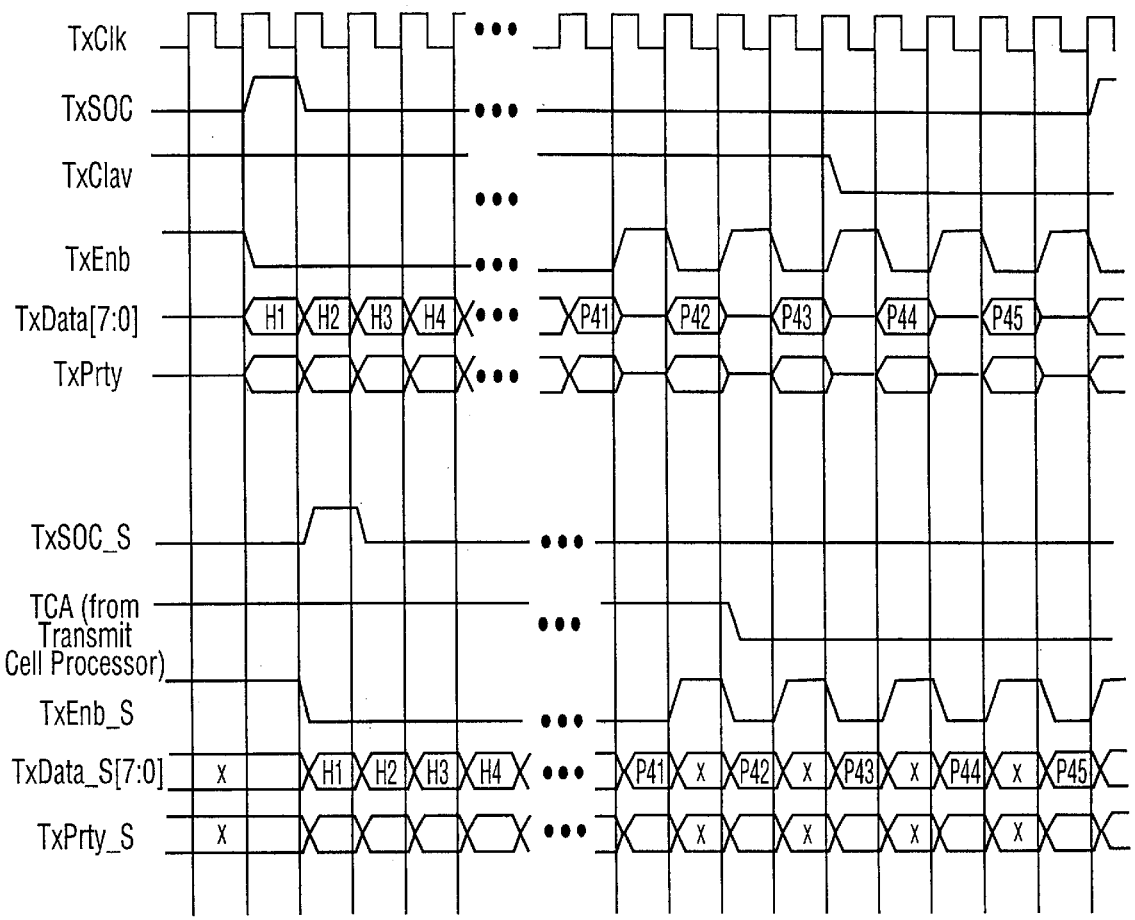
FIG. 9 is a timing diagram illustrating an incorrect prediction of cell transfer activity by a transmit cell processor when byte-level transfer is used and the transfer is interrupted on P42 and then again on P43.

FIG. 9 shows the timing problems which arise when the cell transfer is interrupted at payload byte P42 and then again at payload byte P43. Once again the transmit cell processor 23 incorrectly predicts the transition point for TxClav. In this situation, the TCA signal output by the corresponding transmit cell processor is two clock cycles early.

It will be noted that a transition of the TCA signal to indicate that space in the corresponding transmit FIFO buffer has become available does not result in the same timing problems for the illustrative embodiment of ATM-PHY interface device 20. Transitioning the TCA signal to indicate that space is available in a transmit FIFO buffer depends on the read-side of the transmit FIFO buffer. Thus, a transition of TCA output to indicate space being available is not aligned to any incoming data sampled from the UTOPIA TxData bus. Instead, this transition occurs synchronous to TFCLK once space is available.

Figure 10:
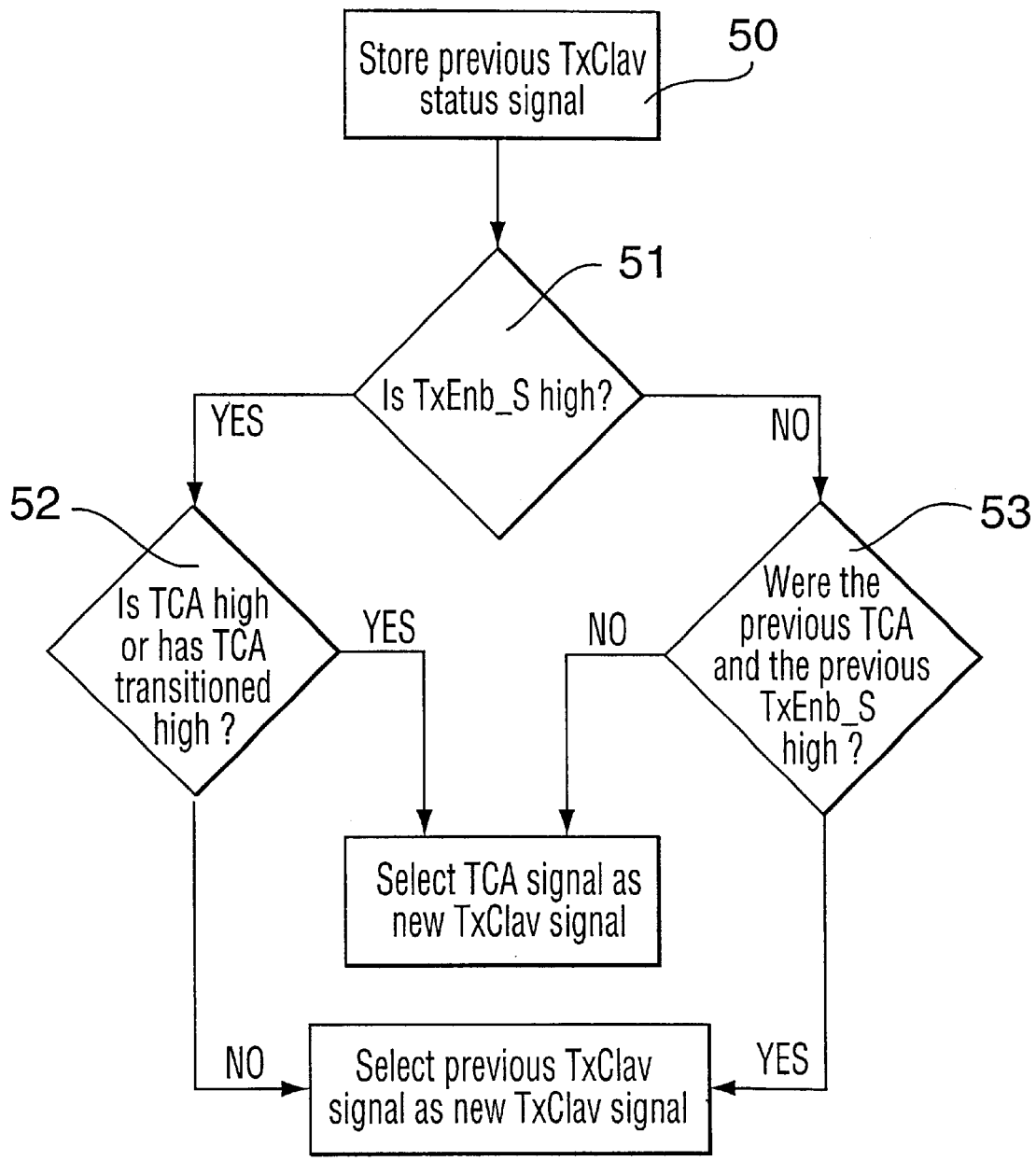
FIG. 10 is a flow diagram illustrating a method of guaranteeing that transmit cell available (TxClav) signals transmitted from an ATM-PHY interface device are UTOPIA-compatible in accordance with the present invention.

Referring to FIGS. 5 and 10, a method is provided for use in state machines 28 in accordance with the present invention in order to ensure the reliable transition of TxClav status signals so as to support a UTOPIA-compatible interface notwithstanding incorrect predictions by the transmit cell processors. As illustrated in FIG. 10, at block 50 the previous TxClav signal is stored. When a new cycle of signals arrives at one of state machines 28, the TxEnb_S signal is evaluated at block 51. TxEnb_S is the sampled version of TxEnb from the localized sampling circuit 24 and is output by circuit 24 on line L3. Feeding TxEnb_S signals to state machines 28 on line L3 for the embodiment in FIG. 5 diverts delay element 48 to ensure that the TxClav signal is generated by ATM-PHY device 20 within a short time after the TxCLK edge. If TxEnb_S is high, then the TCA signal is evaluated at block 52. If at block 52 it is determined that the TCA signal is high or has transitioned high, then the TCA signal becomes the new state of the TxClav signal output by the ATM-PHY interface device 20. If it is determined at block 52 that the TCA signal is not high and has not transitioned high in the current clock cycle, then the previous TxClav signal stored at block 50 becomes the current TxClav signal. On the other hand, when TxEnb_S is low at block 51, the state of the previous TCA and the TxEnb_S signals are evaluated at block 53. If both the previous TCA and TxEnb_S signals from the previous clock cycle are found to be high, then the previous state of TxClav from block 50 is used as the current TxClav signal. If, on the other hand, the previous TCA signal or the previous TxEnb_S signal or both the previous TCA signal and the previous TxEnb_S signal are found to be low, then the current TCA signal becomes the new state of the TxClav signal.

Figure 11:
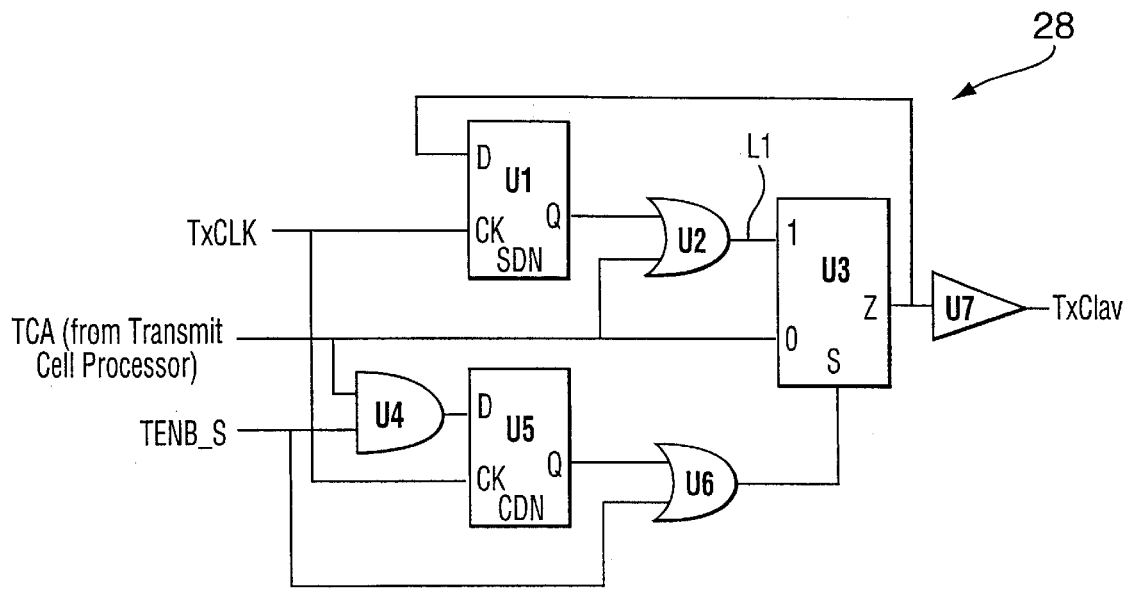
FIG. 11 is a schematic diagram illustrating an embodiment of a state machine which serves as a conditioning circuit guaranteeing that transmit cell available (TxClav) signals transmitted from an ATM-PHY interface device are UTOPIA-compatible in accordance with the present invention.

FIG. 11 shows an illustrative implementation of one of state machines 28 in accordance with the solution described in FIG. 10. With reference to FIGS. 5 and 11, each state machine 28 comprises D flip flops U1 and U5, AND gate U4, OR gates U2 and U6, multiplexer/selector (MUX) U3 and gate U7. Flip flops U1 and U5 each include clock inputs (CK) to receive and synchronize to TxCLK signals. Flip flop U1 holds the last state of the TxClav signal transmitted from output U3.Z. Flip flop U5 is used to keep the TxClav signal for a corresponding transmit cell processor of device 20 in the desired state when data transfer is paused on P42. Multiplexer U3 acts as a selector, to choose as the current TxClav signal between the signal from input line L1 and the signal on the TCA line. The TCA line carries the TCA signal from a corresponding transmit cell processor. In the illustrative embodiment in FIG. 11, the signal on line L1 becomes the TxClav signal when input line S of U3 is high, and the signal on the TCA line becomes the TxClav signal when input line S is low.

In FIG. 11, TxEnb_S signals from localized sampling circuit 24 are fed into a state machine 28 on the TENB_S line and are used to determine, in conjunction with the TCA signal, whether or not the stored state of TxClav should be used as the present TxClav. When TxEnb_S is sampled high, OR gate U6 will set S high. In this state, the previous TxClav signal stored in flip flop U1 will become the new TxClav signal transmitted by U3 unless the TCA signal is high or has transitioned high in the current clock cycle. If the TCA signal is high or transitions high, OR gate U2 will ensure that the signal on line L1 is high. Thus, when TxEnb_S is sampled high, state machine 28 ensures that the previous TxClav signal stored in flip flop U1 becomes the current TxClav signal unless the TCA output of the appropriate transmit cell processor is high or transitions high, in which case the TxClav signal is forced by OR gate U2 to equal the TCA output. Signals transmitted by output Z of U3 (also referred to here as U3.Z) are transmitted to element U7, and are also stored by flip flop U1. It will be appreciated that when TxEnb_S (on the TENB_S line) is high, TxClav cannot transition low. This is because no data transfer is being performed in such a state and so the transmit FIFO buffer for the appropriate transmit cell processor cannot be filled up.

When TxEnb_S is sampled low on the TENB_S line, the TxClav signal is determined by the state of the previous TCA and TxEnb_S signals. If the previous values of TCA and TxEnb_S were both high, output Q from flip flop U5 transitions high, forcing high input S of selector U3. In this case, the previous TxClav stored in flip flop U1 becomes the current TxClav signal for the ATM-PHY device 20. In this way, flip flop U5 keeps the TxClav signal in the correct state even when the data transfer is paused one byte (or word) before the byte (or word) for which the transition point is defined. For instance, in the 8-bit mode for UTOPIA, flip flop U5 keeps the TxClav signal in the correct state when data transfer is paused on P42. If at least one of the previous TCA signal and the previous TxEnb_S signal was not high, S is set low and the current TCA signal becomes the TxClav signal output by device 20.

Figure 12:
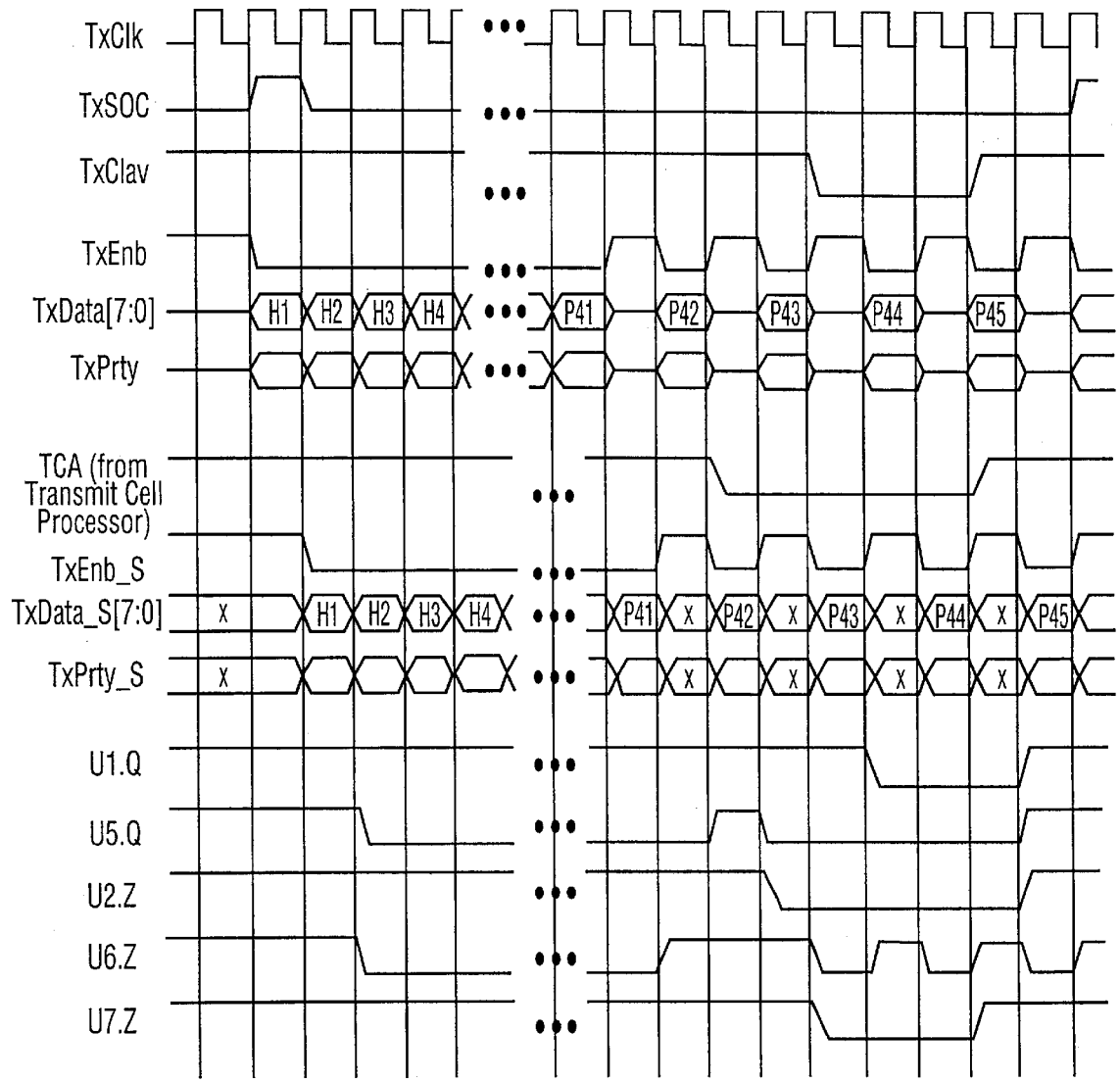
FIG. 12 is a timing diagram illustrating the corrective measures taken by the state machine embodiment of FIG. 11 in accordance with the present invention when cell transfer is interrupted at P42 and P43.

FIG. 12 shows the operation of the gates of one of state machines 28 when data transfer is interrupted on P41, P42, P43, and P44. As illustrated, output U7.Z from U7 conforms with the expected output for TxClav, thereby correcting for misalignment between the raw TCA output by a corresponding transmit cell processor and the expected TxClav output by the ATM-PHY interface device.

Figure 13:
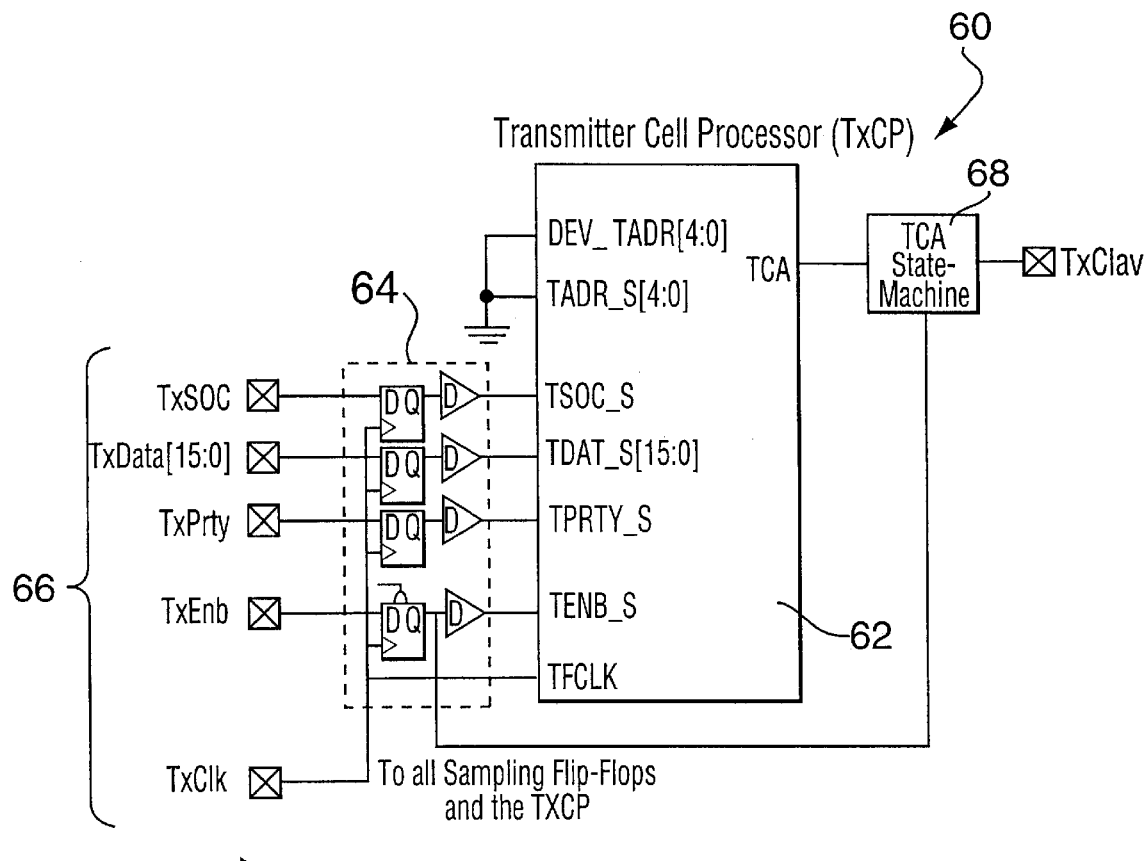
FIG. 13 is a schematic diagram illustrating a single transmit cell processor embodiment of the transmit side of an ATM-PHY interface device in accordance with the present invention.

Referring to FIG. 13, there is shown a variant of the invention for use with UTOPIA Level 1 bus interfaces. In the illustrative embodiment shown in FIG. 13, a block diagram is shown of the transmit side 60 of an ATM-PHY interface device for a single channel transmit and single or multi-channel receive UTOPIA Level 1 bus interface. Transmit side 60 includes transmit cell processor 62, localized sampling circuit 64, and state machine 68. Localized sampling circuit 64 is similar to localized sampling circuit 24 of FIG. 5, except that circuit 64 is designed to interpose UTOPIA Level 1 bus 66 signals and a single transmit cell processor 62. Transmit cell processor 62 corresponds to transmit cell processor 23 of FIG. 5. Furthermore, the architecture of TCA state machine 68 remains unchanged from that of state machines 28 illustrated in FIG. 10.

Although UTOPIA Level 1 configurations use point-to-point connections between UTOPIA interface 66 and transmit cell processor 62, localizing the control signal sampling circuits in circuit 64 nevertheless remains an effective and advantageous means for minimizing the required set-up and hold time requirements of ATM-PHY interface device on transmit side 60. Thus, localized sampling circuit 64 can be used to reduce timing variance of different signals due to layout routing.

Figure 16:
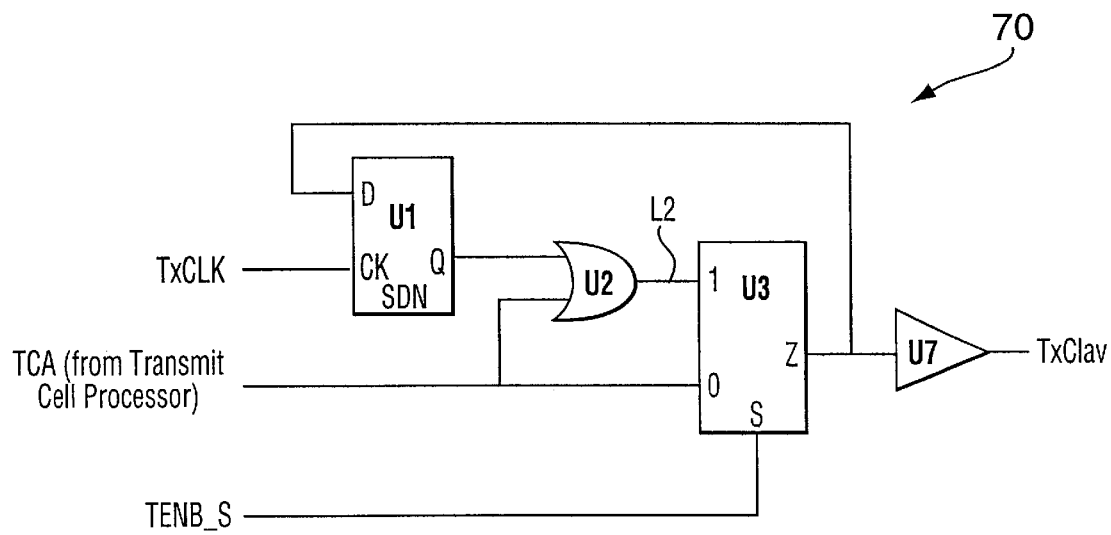
FIG. 16 is a schematic diagram illustrating an alternative state machine embodiment in accordance with the present invention.
Figure 14:
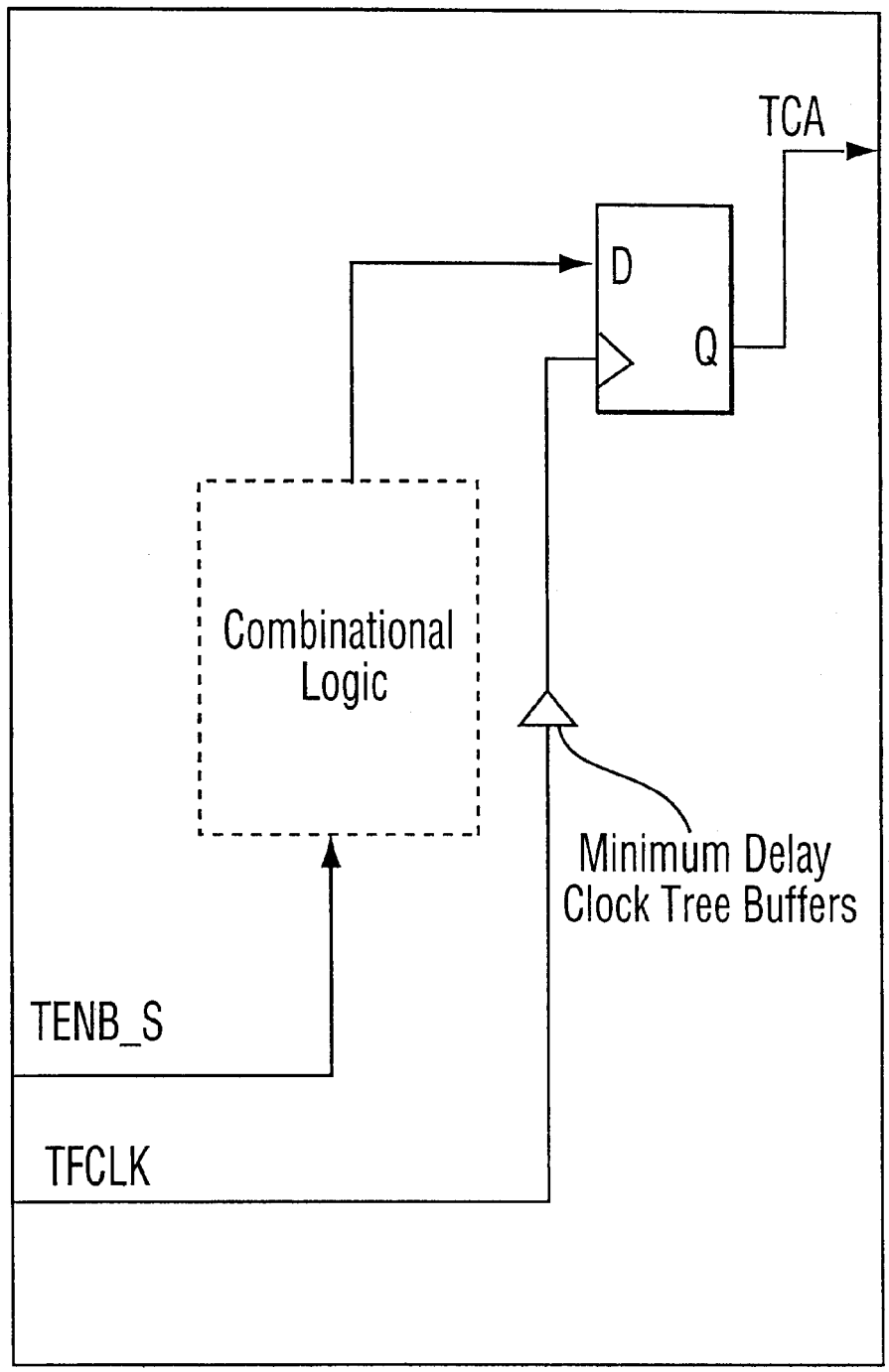
FIG. 14 is a schematic diagram of a transmit cell processor wherein transmit enable signals arriving at an input for the transmit cell processor are not re-sampled.
Figure 15:
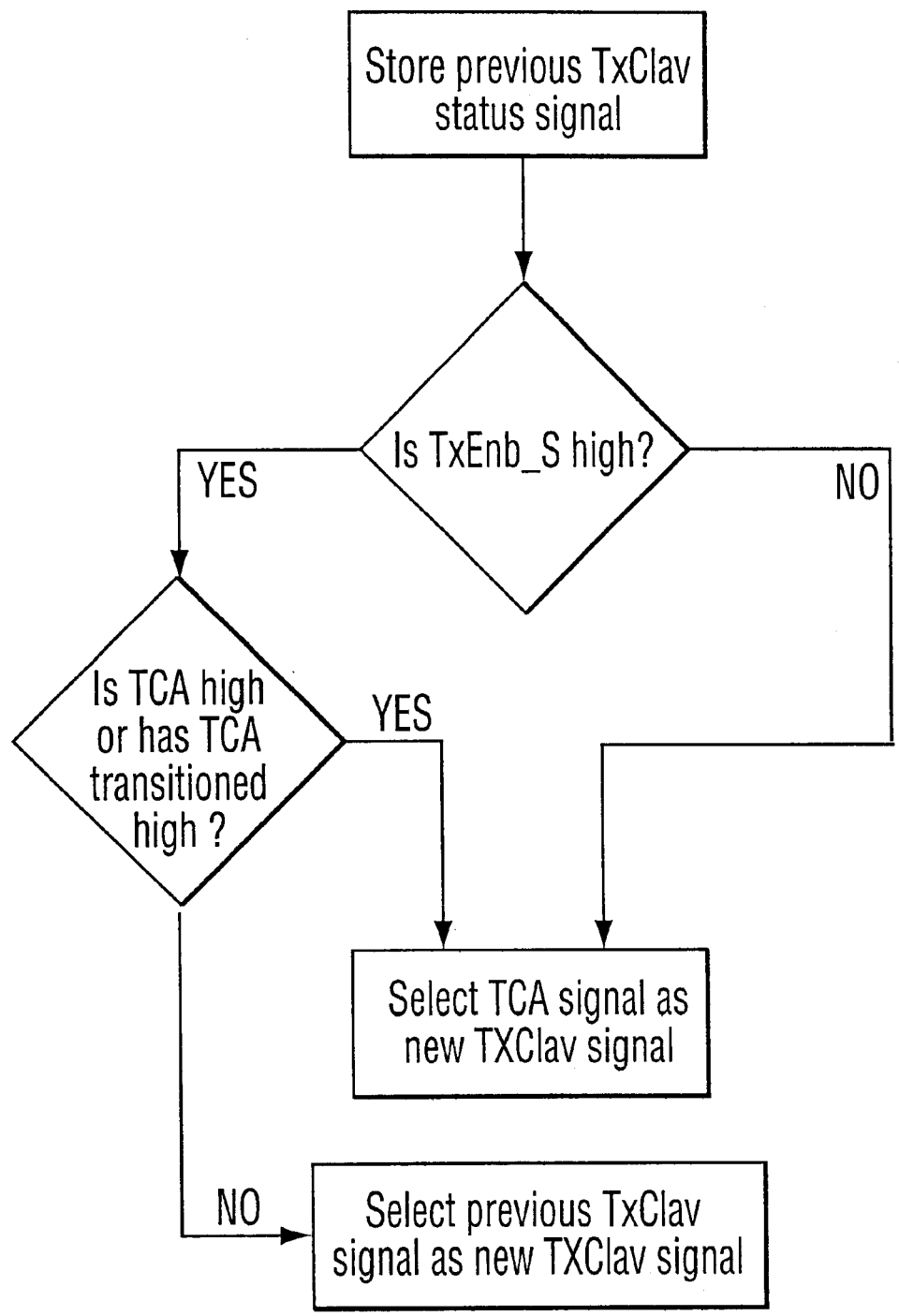
FIG. 15 is a flow diagram illustrating a method of guaranteeing that transmit cell available (TxClav) signals transmitted, from an ATM-PHY interface device having the processor in FIG. 14, are UTOPIA-compatible.

Referring to FIGS. 14, 15 and 16, in another embodiment of the invention, the transmit cell processor block for an ATM-PHY device can be designed so that the transmit cell processor reacts to TxEnb_S signals received from sampling circuit 24 without resampling the TxEnb_S signals as they arrive on the TENB_S input line. The elimination of this extra clock cycle of delay advantageously eliminates one degree of uncertainty and simplifies the architecture of the TCA state machine for the above embodiments in FIG. 5 and FIG. 13. With the elimination of an extra clock cycle of delay, there remains one clock cycle of delay, introduced by the localized sampling circuit (either circuit 24 or 64) which can cause the transmit cell processors to deassert their TCA signals early. In this case, a pause or interruption in a cell transfer on payload byte P42 for the 8-bit interface or word P18 for the 16-bit interface will not cause a corresponding TCA signal to deassert early. However, a pause on P43 for the 8-bit interface or P19 for the 16-bit interface will still cause an error condition in the TCA signaling. As illustrated in FIG. 15, these circumstances are handled by a variation of the method in FIG. 10. In FIG. 15, block 53 has been removed and, in the event TxEnb_S is not determined to be high in block 51, the current TCA signal becomes the new TxClav signal.

Figure 17:
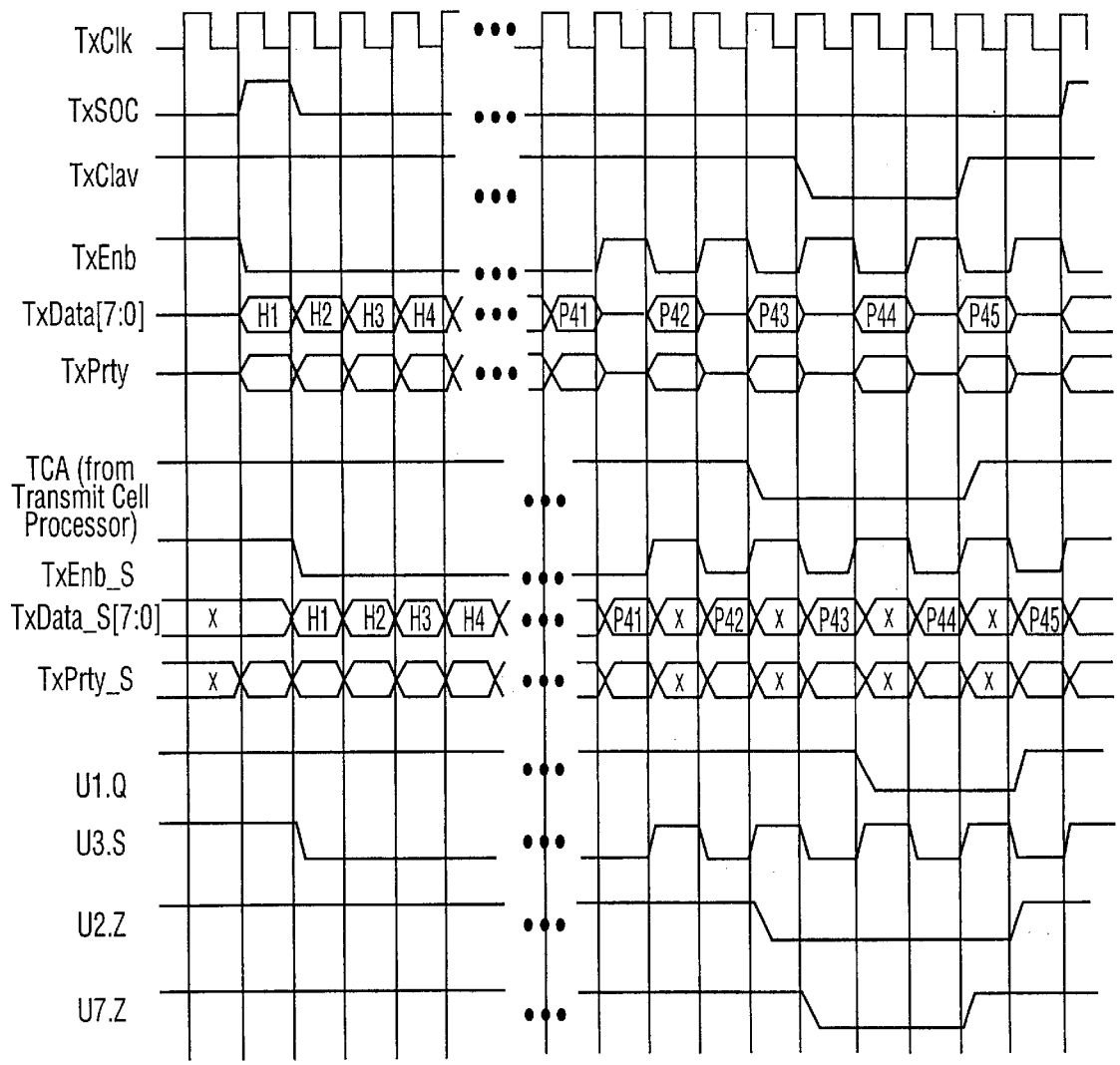
FIG. 17 is a timing diagram illustrating the corrective measures taken by the state machine of FIG. 16 in accordance with the present invention when cell transfer is interrupted.

FIG. 16 shows a state machine 70 implementing the simplified conditions handled in FIG. 15. State machine 70 is shown comprising D flip flop U1, OR gate U2, multiplexer/selector U3 and element U7. In state machine 70, the TxClav signal output by the ATM-PHY interface device is determined based on the TCA and TxEnb_S signals. TxEnb_S signals arrive on the TENB_S input line. When TxEnb_S is high, input from line L2 is selected by selector U3 in which case the previous state of the TxClav signal stored in flip flop U1 becomes the new TxClav signal output by the ATM-PHY device, unless the incoming TCA signal from the transmit cell processors high or transitions high, in which case the new TxClav signal is forced high by OR gate U2 irrespective of the signal held in flip flop U1. If TxEnb_S is low, the TxClav signal is taken from the incoming transmit cell processor TCA signal. Thus, in this latter case selector U3 sets the TCA signal as the new TxClav signal. As illustrated in FIG. 17, state machine 70 conditions the TCA output from the transmit cell processors so that the synthesized TxClav output from state machine 70 on U7.Z conforms with the desired TxClav.

Although this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications and embodiments as fall within the true scope of the invention.

What is claimed is:

1. An interface device for interfacing between an asynchronous transfer mode (ATM) layer device and a physical (PHY) layer device, said interface device comprising:
   a transmit section having a localized sampling architecture and comprising:
      an input interface for receiving input signals according to a communication protocol;
      a sampling circuit having inputs coupled to said input interface, said sampling circuit being operative to sample input signals from said input interface;
      a cell processor having inputs for receiving sampled input signals from said sampling circuit and an output for transmitting an output signal to another circuit, said cell processor being operative to substantially predict the behavior of input signals arriving on said input interface, said output signal being used as a transmission status signal output by said interface device; and
      means for correcting the output signal transmitted by said cell processor so as to ensure that said transmission status signal output by said interface device does not transition out of synch with the requirements of the communication protocol.

2. An interface device according to claim 1, wherein the communication protocol is UTOPIA and wherein the transmission status signal is a transmit cell available (TxClav) signal.

3. An interface device according to claim 2, wherein said means for correcting comprises a conditioning circuit coupled to said cell processor, said conditioning circuit being operative to guarantee that transitions of transmit cell available signals transmitted from said interface device conform to the communication protocol in an n-bit mode of data transmission, wherein n is a finite positive integer.

4. An interface device according to claim 3, wherein the n-bit mode of data transmission is selected from one of: (a) an 8-bit data transfer mode, and (b) a 16-bit data transfer mode.

5. An interface device according to claim 3, said conditioning circuit being operative to guarantee that the transmit cell available signals transmitted by said interface device conform to the communication protocol when cell transfer is interrupted on:
   (a) any of payload byte 42 (P42) and payload byte 43 (P43) in an 8-bit data transfer mode; and
   (b) any of payload byte 18 (P18) and payload byte 19 (P19) in a 16-bit data transfer mode.

6. An interface device according to claim 1, wherein said interface device introduces at least a one clock cycle delay into signals transmitted through said interface device in accordance with the communication protocol.

7. An interface device according to claim 1, wherein said interface device introduces a plurality of clock cycle delays into signals transmitted through said interface device in accordance with the communication protocol.

8. An interface device according to claim 1, wherein the communication protocol is UTOPIA and wherein said means for correcting comprises a conditioning circuit coupled to said cell processor, said conditioning circuit having:
   means for storing a previous transmit cell available signal from a previous clock cycle;
   means for receiving a transmit status signal output from said cell processor and a transmit enable signal in a current clock cycle;
   means for selecting said transmit status signal as a new transmit cell available signal for transmission from the interface device if: (a) in the current clock cycle the transmit enable signal is high and the transmit status signal is high, (b) in the current clock cycle the transmit enable signal is high and the transmit status signal transitions high, or (c) the transmit enable signal is low and at least one of (i) a previous transmit status signal and (ii) a previous transmit enable signal was not high; and
   means for selecting said previous transmit cell available signal as the new transmit cell available signal for transmission from the interface device if: (a) in the current clock cycle the transmit enable signal is high and the transmit status signal is low, (b) in the current clock cycle the transmit enable signal is high and the transmit status signal transitions low, or (c) the transmit enable signal is low and both the previous transmit enable signal and the previous transmit status signal were high.

9. An interface device according to claim 8, wherein said interface device introduces a plurality of clock cycle delays into signals transmitted through said interface device in accordance with the communication protocol.

10. An interface device according to claim 1, wherein the communication protocol is UTOPIA and wherein said means for correcting comprises a conditioning circuit coupled to said cell processor, said conditioning circuit having:
   means for storing a previous transmit cell available signal from a previous clock cycle;
   means for receiving a transmit status signal output from said cell processor and a transmit enable signal in a current clock cycle;
   means for selecting said transmit status signal as a new transmit cell available signal for transmission from the interface device if, in the current clock cycle, (a) the transmit enable signal is high and the transmit status signal is high, (b) the transmit enable signal is high and the transmit status signal transitions high, or (c) the transmit enable signal is low; and means for selecting said previous transmit cell available signal as the new transmit cell available signal for transmission from the interface device if, in the current clock cycle, the transmit enable signal is high and the transmit status signal is low or transitions low.

11. An interface device according to claim 10, wherein said interface device introduces at least a one clock cycle delay into signals transmitted through said interface device in accordance with the communication protocol.

12. An interface device for interfacing between at least one asynchronous transfer mode (ATM) layer device and a plurality of physical (PHY) layer devices, said interface device comprising:

a transmit section having a localized sampling architecture and comprising:
an input interface for receiving input signals according to a communication protocol;
a sampling circuit having inputs coupled to said input interface, said sampling circuit being operative to sample input signals from said input interface;
a plurality of cell processors each having inputs for receiving sampled input signals from said sampling circuit and an output for transmitting an output signal to another circuit, said cell processors being operative to substantially predict the behavior of input signals arriving on said input interface, said output signal being used as a transmission status signal output by said interface device; and
means for correcting output signals transmitted by said cell processors so as to ensure that the transmission status signals output by said interface device do not transition out of synch with the requirements of the communication protocol.

13. An interface device according to claim 12, wherein the communication protocol is UTOPIA and wherein said means for correcting comprises a conditioning circuit coupled to said cell processors, said conditioning circuit having:

means for storing previous transmit cell available signals and previous transmit status signals from a previous clock cycle;

means for receiving transmit status signals and said previous transmit status signals output from said cell processors and a transmit enable signal in a current clock cycle;

means for selecting said transmit status signals as new transmit cell available signals for transmission from the interface device, wherein said means for selecting said transmit status signals is operative, with respect to any particular one of said cell processors, to select the transmit status signal output from said particular cell processor if:
(a) in the current clock cycle the transmit enable signal is high and the transmit status signal is high,
(b) in the current clock cycle the transmit enable signal is high and the transmit status signal transitions high, or
(c) the transmit enable signal is low and at least one of (i) the previous transmit status signal and (ii) a previous transmit enable signal was not high; and means for selecting said previous transmit cell available signals as the new transmit cell available signals for transmission from the interface device, wherein said means for selecting said previous transmit cell available signals is operative, with respect to any particular one of said cell processors, to select said previous transmit cell available signal output from said particular cell processor if:
(a) in the current clock cycle the transmit enable signal is high and the transmit status signal is low,
(b) in the current clock cycle the transmit enable signal is high and the transmit status signal transitions low, or
(c) the transmit enable signal is low and both the previous transmit enable signal and the previous transmit status signal were high.

14. An interface device according to claim 13, wherein said interface device introduces a plurality of clock cycle delays into signals transmitted through said interface device in accordance with the communication protocol.

15. An interface device according to claim 12, wherein the communication protocol is UTOPIA and wherein said means for correcting comprises a conditioning circuit coupled to said cell processors, said conditioning circuit having:

means for storing previous transmit cell available signals and previous transmit status signals from a previous clock cycle;

means for sampling transmit status signals and said previous transmit status signals output from said cell processors and a transmit enable signal in a current clock cycle;

means for selecting said transmit status signals as new transmit cell available signals for transmission from the interface device, wherein said means for selecting said transmit status signals is operative, with respect to any particular one of said cell processors, to select said transmit status signal if in the current clock cycle, (a) the transmit enable signal is high and the transmit status signal is high, (b) the transmit enable signal is high and the transmit status signal transitions high, or (c) the transmit enable signal is low; and means for selecting said previous transmit cell available signals as the new transmit cell available signals for transmission from the interface device, wherein said means for selecting said previous transmit cell available signals is operative, with respect to any particular one of said cell processors, to select said previous transmit cell available signal output from said particular cell processor if, in the current clock cycle, the transmit enable signal is high and the transmit status signal is low or transitions low.

16. An interface device according to claim 15, wherein said interface device introduces at least a one clock cycle delay into signals transmitted through said interface device in accordance with the communication protocol.

17. An interface device according to claim 12, wherein said means for correcting comprises a conditioning circuit coupled to said cell processors, said conditioning circuit being operative to guarantee that transitions of transmit cell available signals transmitted from said interface device conform to the communication protocol in an n-bit mode of data transmission, wherein n is a finite positive integer.

18. A method of guaranteeing that transmit cell available signals transmitted from an interface device conform to a UTOPIA communication protocol, said interface device being operative to interface between at least one asynchronous transfer mode (ATM) layer device and at least one physical (PHY) layer device, the method comprising the steps of:

storing a previous transmit cell available signal from a previous clock cycle;

receiving a transmit status signal and a transmit enable signal in a current clock cycle;

selecting said transmit status signal as a new transmit cell available signal for transmission from the interface device if: (a) in the current clock cycle the transmit enable signal is high and the transmit status signal is high, (b) in the current clock cycle the transmit enable signal is high and the transmit status signal transitions high, or (c) the transmit enable signal is low and at least one of (i) a previous transmit status signal and (ii) a previous transmit enable signal was not high; and selecting said previous transmit cell available signal as the new transmit cell available signal for transmission from the interface device if: (a) in the current clock cycle the transmit enable signal is high and the transmit status signal is low, (b) in the current clock cycle the transmit enable signal is high and the transmit status signal transitions low, or (c) the transmit enable signal is low and both the previous transmit enable signal and the previous transmit status signal were high.

19. A method according to claim 18, further comprising the step of storing the new transmit cell available signal as the previous transmit cell available signal and repeating the method for a next clock cycle.

20. A method of guaranteeing that transmit cell available signals transmitted from an interface device conform to a UTOPIA communication protocol, said interface device being operative to interface between at least one asynchronous transfer mode (ATM) layer device and at least one physical (PHY) layer device, the method comprising the steps of:

storing a previous transmit cell available signal from a previous clock cycle;

receiving a transmit status signal and a transmit enable signal in a current clock cycle;

selecting said transmit status signal as a new transmit cell available signal for transmission from the interface device if, in the current clock cycle, (a) the transmit enable signal is high and the transmit status signal is high, (b) the transmit enable signal is high and the transmit status signal transitions high, or (c) the transmit enable signal is low; and selecting said previous transmit cell available signal as the new transmit cell available signal for transmission from the interface device if, in the current clock cycle, the transmit enable signal is high and the transmit status signal is low or transitions low.

21. A method according to claim 20, further comprising the step of storing the new transmit cell available signal as the previous transmit cell available signal and repeating the method for a next clock cycle.

22. Apparatus for guaranteeing that transmit cell available signals transmitted from an interface device conform to a communication protocol, the interface device being operative to interface between an asynchronous transfer mode layer device and a physical layer device, the apparatus comprising:

means for storing a previous transmit cell available signal from a previous clock cycle;

means for receiving a transmit status signal and a transmit enable signal in a current clock cycle;

means for selecting said transmit status signal as a new transmit cell available signal for transmission from the interface device if, in the current clock cycle, (a) the transmit enable signal is high and the transmit status signal is high, or (b) the transmit enable signal is high and the transmit status signal transitions high; and means for selecting said previous transmit cell available signal as the new transmit cell available signal for transmission from the interface device if, in the current clock cycle, (a) the transmit enable signal is high and the transmit status signal is low, or (b) the transmit enable signal is high and the transmit status signal transitions low.

23. Apparatus according to claim 22, including:

means for selecting said transmit status signal as the new transmit cell available signal if the transmit enable signal is low and at least one of (i) a previous transmit status signal and (ii) a previous transmit enable signal was not high; and means for selecting said previous transmit cell available signal as the new transmit cell available signal if the transmit enable signal is low and both the previous transmit enable signal and the previous transmit status signal were high.

24. Apparatus according to claim 22, including:

means for selecting said transmit status signal as the new transmit cell available signal if the transmit enable signal is low in the current clock cycle.

* * * * *